US009109346B2

(12) United States Patent
Yoshino et al.

(10) Patent No.: US 9,109,346 B2
(45) Date of Patent: Aug. 18, 2015

(54) HYDRAULIC SWING-CONTROLLING APPARATUS OF WORK MACHINE

(75) Inventors: Tetsuya Yoshino, Tokyo (JP); Seiichi Akiyama, Tokyo (JP); Yuya Kanenawa, Tokyo (JP)

(73) Assignee: Caterpillar SARL, Geneva (CH)

( * ) Notice: Subject to any disclaimer, the term of this patent is extended or adjusted under 35 U.S.C. 154(b) by 716 days.

(21) Appl. No.: 13/382,127

(22) PCT Filed: Aug. 18, 2010

(86) PCT No.: PCT/JP2010/063931

§ 371 (c)(1),
(2), (4) Date: Feb. 13, 2012

(87) PCT Pub. No.: WO2011/065073

PCT Pub. Date: Jun. 3, 2011

(65) Prior Publication Data

US 2012/0131913 A1 May 31, 2012

(30) Foreign Application Priority Data

Nov. 26, 2009 (JP) ................................ 2009-268702

(51) Int. Cl.
*F16D 31/02* (2006.01)
*E02F 9/22* (2006.01)
(Continued)

(52) U.S. Cl.
CPC ............... *E02F 9/2235* (2013.01); *E02F 9/123* (2013.01); *E02F 9/2282* (2013.01);
(Continued)

(58) Field of Classification Search
CPC ........ F15B 11/166; F15B 11/167; E02F 3/43; E02F 9/20; E02F 9/22; E02F 9/10; E02F 9/121; E02F 9/08; E02F 9/123; E02F 9/2285; F04B 9/002
USPC .................................................... 60/459, 463
See application file for complete search history.

(56) References Cited

U.S. PATENT DOCUMENTS

| | | | | |
|---|---|---|---|---|
| 6,672,055 | B1 * | 1/2004 | Konishi et al. | 60/449 |
| 2003/0172650 | A1 * | 9/2003 | Konishi et al. | 60/421 |
| 2004/0231326 | A1 * | 11/2004 | Imanishi et al. | 60/534 |
| 2005/0204735 | A1 * | 9/2005 | Sugano | 60/452 |
| 2007/0204606 | A1 * | 9/2007 | Imanishi et al. | 60/443 |

FOREIGN PATENT DOCUMENTS

| | | | |
|---|---|---|---|
| EP | 1154162 | A1 | 11/2001 |
| EP | 1479920 | A2 | 11/2004 |

(Continued)

*Primary Examiner* — Dwayne J White
*Assistant Examiner* — Matthew Wiblin
(74) *Attorney, Agent, or Firm* — Birch, Stewart, Kolasch & Birch, LLP

(57) ABSTRACT

In a work machine including a hydraulic pump (1), a swing motor (2), and swing relief valves (3*a* and 3*b*), the amount of the swing operation ($P_1$) related to the swing motion of the swing motor (2) is detected, and the hydraulic pressure ($P_2$) supplied from the hydraulic pump (1) to the swing motor is also detected. Additionally, the required flow rate ($F_R$) of hydraulic oil required for the swing motor (1) is set based on the amount of the swing operation ($P_1$). In addition, the volume of relief ($F_E$) is estimated from the hydraulic pressure ($P_2$) based on the override characteristics of the swing relief valves (3*a* and 3*b*). The discharge flow rate of the hydraulic pump (1) is controlled based on the value obtained by subtracting the volume of relief ($F_E$) from the required flow rate ($F_R$).

4 Claims, 4 Drawing Sheets

(51) Int. Cl.
*F04B 49/00* (2006.01)
*E02F 9/12* (2006.01)

(52) U.S. Cl.
CPC ............ *E02F 9/2285* (2013.01); *E02F 9/2296* (2013.01); *F04B 49/002* (2013.01); *F15B 2211/20546* (2013.01); *F15B 2211/3051* (2013.01); *F15B 2211/50518* (2013.01); *F15B 2211/50527* (2013.01); *F15B 2211/6054* (2013.01); *F15B 2211/6309* (2013.01); *F15B 2211/6316* (2013.01); *F15B 2211/65* (2013.01); *F15B 2211/7058* (2013.01)

(56) References Cited

FOREIGN PATENT DOCUMENTS

| | | | | | |
|---|---|---|---|---|---|
| EP | 1526221 | A1 | | 4/2005 | |
| EP | 1830066 | A2 | | 9/2007 | |
| JP | 6-330902 | A | | 11/1994 | |
| JP | 9-195322 | A | | 7/1997 | |
| JP | 10-30605 | A | | 2/1998 | |
| JP | 2004-225867 | A | | 8/2004 | |
| JP | 2004225867 | A | * | 8/2004 | ............. F15B 11/00 |

* cited by examiner

Override characteristics of a swing relief valve

HYDRAULIC SWING-CONTROLLING APPARATUS OF WORK MACHINE

TECHNICAL FIELD

The present invention relates to a power controller of a hydraulic pump for a swing motion of a work machine.

BACKGROUND ART

In a work machine, such as a hydraulic excavator, an oil-hydraulic motor can swing a revolving upper-structure on a base carrier. Since a work machine has a high moment of inertia, the hydraulic pressure in an oil-hydraulic circuit becomes extremely high and causes the relief losses of hydraulic oil while the oil-hydraulic motor is starting and accelerating. A variety of techniques have been proposed for reducing such relief losses.

For example, Patent Literature 1 discloses a technique which decreases the discharge flow rate of a hydraulic pump to reduce relief losses during operation of a swing motor. This technique involves detection of a pilot pressure from a pilot valve linked to a swing lever, detection of a hydraulic pressure over the circuit between a flow rate control valve and the swing motor, and control of a swash plate angle of a hydraulic pump based on these values. Such a configuration can reduce relief losses, and prevent the degradation of the swing motor caused by heat generation and high temperature.

CITATION LIST

Patent Literature

[PTL 1]
Japanese Patent Laid-open No. 9-195322

SUMMARY OF THE INVENTION

Problems to be Solved by the Invention

The technique described in Patent Literature 1 involves control of the swash plate of the hydraulic pump such that a flow rate Qn+q for a flow demand Qn is discharged from the hydraulic pump, where the flow rate Qn+q is obtained by adding a relief flow rate q required for the motion of the swing motor to the flow demand Qn at a swing rate while a swing motor is starting and accelerating. Since the swing rate of the machine body generally fluctuates widely depending on the machine body postures, it is difficult to calculate the flow demand Qn from the pilot pressure of the swing lever and a relief pressure.

The fluctuation of the swing rate after swing motion is started is shown by solid lines M1, M2 in FIG. 4. Since the moment of inertia of the machine body increases with the maximum reach posture in which front work equipment (such as a boom device, an arm device, and a bucket device) is extended forward from the center of the machine body, the swing rate does not tend to increase as shown by the solid line M1. On the contrary, since the moment of inertia of the machine body decreases with the minimum reach posture in which the front work equipment is contracted to the center of the machine body, the swing rate tends to increase, as shown by the solid line M2. In the technique described in Patent Literature 1, it is difficult to make the discharge flow rate of the hydraulic pump follow after such fluctuation of swing rate. As a result, the flow demand Qn depending on the machine body postures cannot be exactly determined.

In particular, in the technique described in Patent Literature 1, since the relief pressure is reflected to control of the discharge flow rate only after the hydraulic oil is relieved from the relief valve, the delay of the control is too large to control the actual relief flow rate to q. An object of the present invention, which has been accomplished in view of such a problem is to provide a hydraulic swing-controlling apparatus of a work machine, which exhibits improved control responsiveness in hydraulic control for reducing the relief losses during the acceleration of the swing motion.

Solution to Problem

In order to accomplish the object, a hydraulic swing-controlling apparatus of a work machine of the present invention according to the first aspect includes a hydraulic pump installed in the work machine; a swing motor which receives supply of hydraulic oil from the hydraulic pump and swings the work machine; a swing relief valve which defines the upper limit of a pressure of the hydraulic oil in an oil-hydraulic circuit connecting between the hydraulic pump and the swing motor during operation of the swing motor; hydraulic pressure detecting means which detects a hydraulic pressure supplied from the hydraulic pump to the swing motor; swing operation amount detecting means which detects the amount of the swing operation related to a swing motion of the swing motor; required flow rate setting means which sets a required flow rate of the hydraulic oil required for the swing motor based on the amount of the swing operation detected by the swing operation amount detecting means; relief volume estimating means which estimates the volume of relief of the hydraulic oil relieved from the swing relief valve based on the hydraulic pressure detected by the hydraulic pressure detecting means; pump flow rate subtracting means which calculates an appropriate flow rate by subtracting the volume of relief estimated by the relief volume estimating means from the required flow rate set by the required flow rate setting means; and discharge flow rate controlling means which controls the discharge flow rate of the hydraulic pump based on the appropriate flow rate calculated by the pump flow rate subtracting means, wherein the relief volume estimating means estimates the volume of relief based on the hydraulic pressure and the override characteristics of the swing relief valve.

Note that the volume of relief may take not only a positive value but also a negative value. In other words, the relief pressure is estimated in a positive range in a state where a hydraulic pressure in the oil-hydraulic circuit extending from the hydraulic pump to the swing motor exceeds a relief pressure, and is estimated in a negative range in a state where a hydraulic pressure in the oil-hydraulic circuit extending from the hydraulic pump to the swing motor does not exceed the relief pressure.

Therefore if the relief pressure is positive, the appropriate flow rate will be smaller than the required flow rate. And if the relief pressure is negative, a negative value will be subtracted from the required flow rate so that the appropriate flow rate will be larger than the required flow rate.

Additionally, the override characteristics refers to the correspondence relation between the volume of relief and the primary pressure in a phenomenon in which the hydraulic pressure at the primary side (primary pressure) exceeds the relief pressure and still increases with an increase in the volume of relief.

For example, the swing relief valve is completely closed at a primary pressure less than the relief pressure, and is opened at a primary pressure equal to or higher than the relief pressure. A function required for the swing relief valve is control of the volume of relief such that the primary pressure does not exceed the relief pressure. The actual primary pressure, however, increases slightly with an increase in the volume of relief. In general, a predetermined functional relation is found between the primary pressure and the volume of relief in a range beyond the relief pressure. In the present invention, the volume of relief is estimated such a functional relation.

Additionally, in the hydraulic swing-controlling apparatus of a work machine of the present invention according to the second aspect, along with the configuration of the first aspect, the relief volume estimating means estimates the volume of relief as a positive value if the hydraulic pressure is higher than the relief pressure of the swing relief valve, and estimates the volume of relief as a negative value if the hydraulic pressure is lower than the relief pressure of the swing relief valve.

Additionally, in the hydraulic swing-controlling apparatus of a work machine of the present invention according to the third aspect, along with the configuration of the first or second aspect, the required flow rate setting means sets the required flow rate as a function of elapsed time from the detection of the amount of the swing operation by the swing operation amount detecting means, and sets the maximum value of the required flow rate which increases as the amount of the swing operation increases.

Advantage Effects of Invention

According to the hydraulic swing-controlling apparatus of a work machine of the present invention the first aspect, the volume of relief during the swing operation can be held uniformly by controlling the discharge flow rate of the hydraulic pump based on a value which is obtained by subtracting the volume of hydraulic oil to be relieved from the required flow rate set based on the amount of the swing operation. This can reduce the relief losses at the beginning of the swing motion and enhances the energy efficiency, for example.

According to the hydraulic swing-controlling apparatus of a work machine of the present invention the second aspect, the volume of relief is estimated to be a negative value if the hydraulic pressure is lower than the relief pressure, hence, the appropriate flow rate can be increased to be more than the required flow rate. Accordingly, the supply of hydraulic oil may be increased within a range where the volume of relief is kept to the minimum in the state of a machine body posture with a high swing rate. The supply of hydraulic oil can be decreased so as to decrease the volume of relief to the minimum in the state of the machine body posture with low swing rate. The most appropriate swing flow rate can be held regardless of the machine body postures and the energy efficiency can be improved.

Additionally, according to the hydraulic swing-controlling apparatus of a work machine of the present invention the third aspect, the swing rate can be easily controlled uniformly by setting the required flow rate as a function of the elapsed time from the start of the swing operation.

DESCRIPTION OF EMBODIMENT

An embodiment of the present invention will be described below with reference to the drawings.

[1. Circuit Configuration]

[1-1. Swing Oil-Hydraulic Circuit L1]

Figure 1:
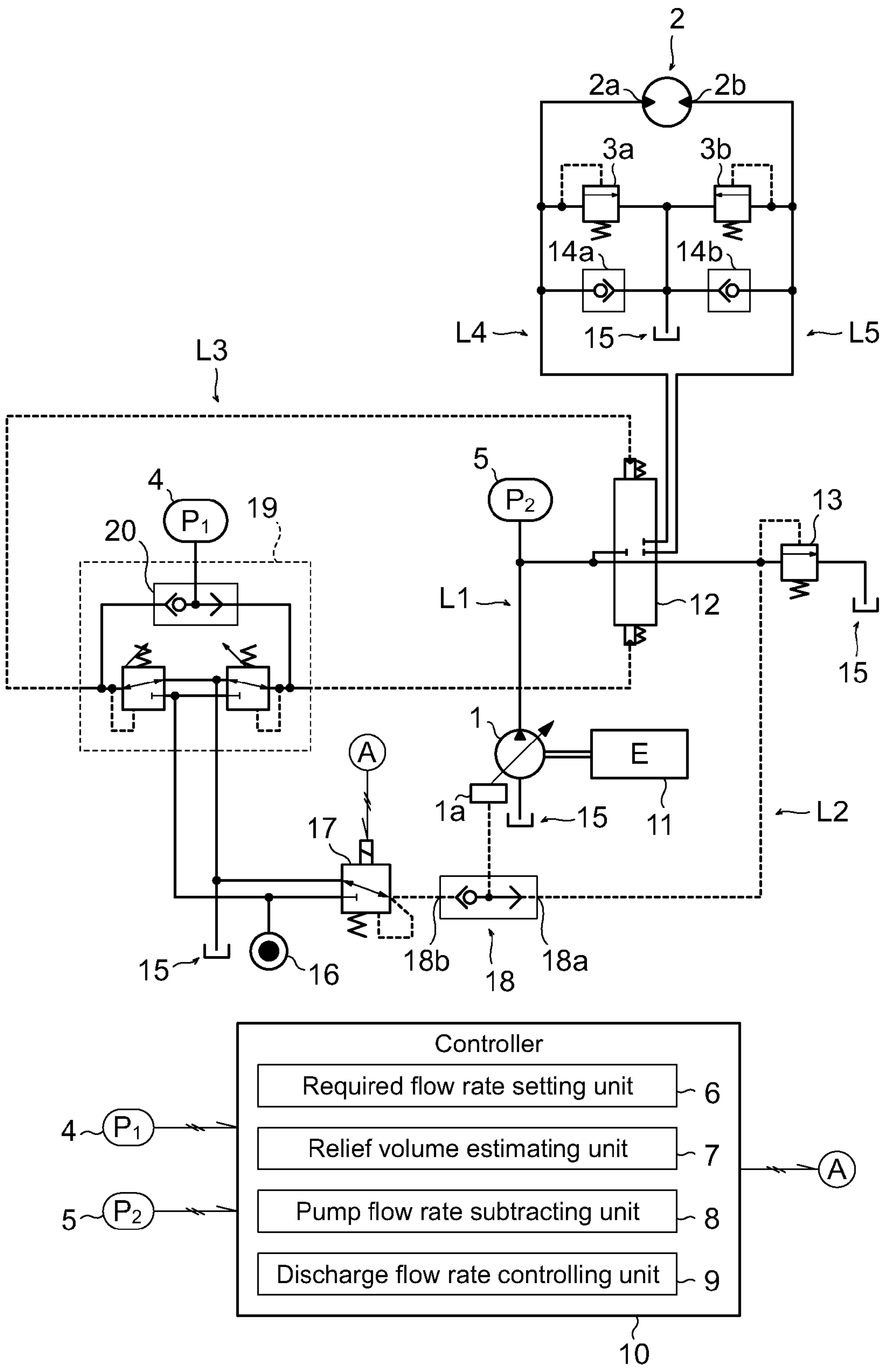
FIG. 1 is an oil-hydraulic circuit diagram showing the entire configuration of a circuit rerating to the swing motion of a work machine which includes a hydraulic swing-controlling apparatus according to one embodiment of the present invention.

The present invention is applied to an oil-hydraulic circuit of a hydraulic excavator shown in FIG. 1. The drawing schematically illustrates the circuit relating to a swing motor 2 which swings the revolving supra-structure of the hydraulic excavator in a horizontal direction relative to a base carrier and circuits relating to other actuators are omitted. Note that this hydraulic excavator also includes other actuators, for example, a hydraulic cylinder relating to the drive of general front work equipment such as a boom device and an arm device.

This oil-hydraulic circuit includes a swing oil-hydraulic circuit L1 which supplies hydraulic oil to a swing motor 2, a negative control circuit L2, and an operation pilot circuit L3 of the swing motor 2.

A hydraulic pump 1, a swing motor 2, and a control valve 12 are disposed on the swing oil-hydraulic circuit L1. The hydraulic pump 1 is a variable capacity pump including a regulator 1*a*. This hydraulic pump 1 is driven by an engine 11 which is the main driving source of a hydraulic excavator, and sucks in the hydraulic oil stored in a hydraulic oil tank 15 to discharge it toward the swing motor 2. The regulator 1*a* is a device for controlling the swash plate angle of the hydraulic pump 1 to change the discharge flow rate adequately.

This swing motor 2 is an oil-hydraulic motor for swing the hydraulic excavator. The swing motor 2 includes two hydraulic oil ports 2*a*, 2*b*, and is configured to change the turning direction to the forward or reverse direction depending on the flow direction of the supplied hydraulic oil. Note that the turning direction of the swing motor 2 corresponds to the swing direction of the hydraulic excavator.

The control valve 12 is a solenoid flow rate controlling valve which variably controls the flow rate and the flow direction of hydraulic oil by changing the position of a flow rate control spool (stem) between several positions. The positions of the flow rate control spool include a position for supplying the hydraulic oil discharged from the hydraulic pump 1 to the first hydraulic oil port 2*a* of the swing motor 2, a position for supplying the hydraulic oil to the second hydraulic oil port 2*b* of the swing motor 2, and a position for blocking both the hydraulic oil ports 2*a*, 2*b*. Hereinafter, a flow path connecting the control valve 12 and the first hydraulic oil port 2*a* is referred to as a first supply path L4, and a flow path connecting the control valve 12 and the second hydraulic oil port 2*b* is called as a second supply path L5.

Two flow paths connected to a hydraulic oil tank 15 branch off from the first supply path L4 and second supply path L5. Swing relief valves 3*a* and 3*b* are disposed in one of the two flow paths, and vacuum regulator valves 14*a*, 14*b* are disposed in the other of the two flow paths.

Figure 2:
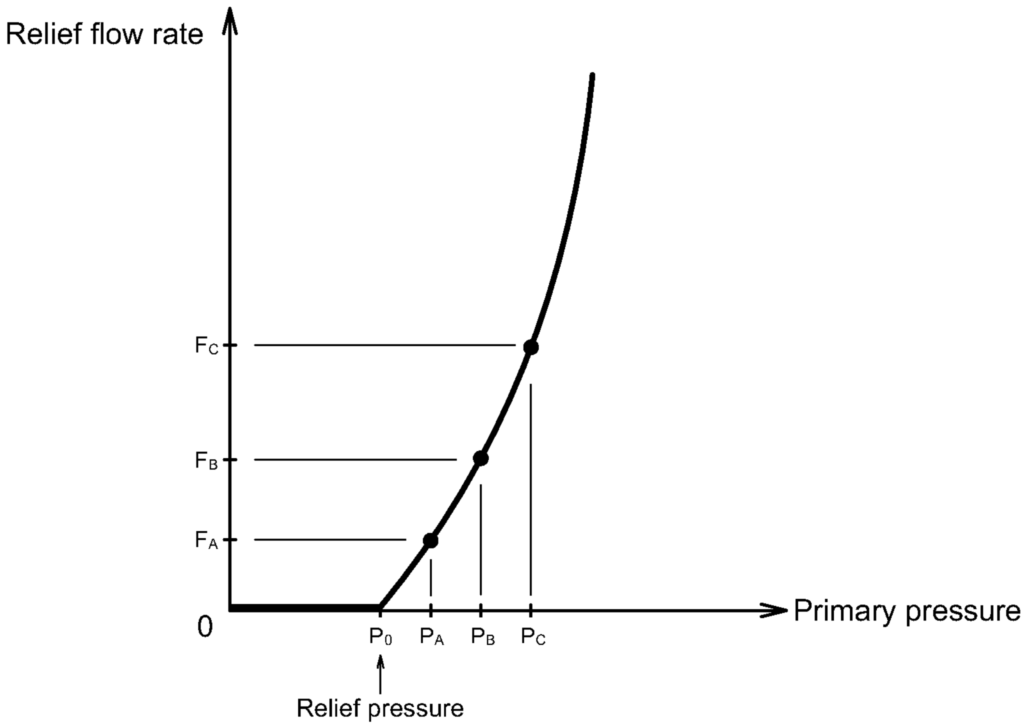
FIG. 2 is a graph showing the override characteristics of a swing relief valve in this hydraulic swing-controlling apparatus.

The swing relief valves 3*a* and 3*b* each defines the upper limit pressure $P_0$ (relief pressure) of the hydraulic oil which flows in from the first supply path L4 and second supply path L5, and open a valving element to discharge hydraulic oil to the hydraulic oil tank 15 if the hydraulic pressure equal to or higher than the upper limit pressure $P_0$ works. The swing relief valves 3*a* and 3*b* have the override characteristics shown in FIG. 2.

The override characteristics refers to the correspondence relation between the volume of relief and the primary pressure in a phenomenon in which the hydraulic pressure at the primary side (primary pressure, the hydraulic pressure at the side of the swing motor 2 from the swing relief valves 3*a* and 3*b*) exceeds the upper limit pressure $P_0$ and still increases with an increase in the volume of relief.

For example, the swing relief valves 3*a* and 3*b* close the valving element completely to make the relief flow rate zero at a primary pressure less than the relief pressure $P_0$, and open the valving element at a primary pressure in the range equal to or higher than the relief pressure $P_0$. In general, a function required for the swing relief valves 3*a* and 3*b* is control of the volume of relief when the valving element opens such that the primary pressure does not exceed the relief pressure $P_0$. The actual primary pressure, however, increases slightly with an increase in the volume of relief. In general, a predetermined functional relation is found between the primary pressure and the volume of relief in a range beyond the relief pressure $P_0$. In the present invention, the volume of relief is estimated from such a functional relation.

The vacuum regulator valves 14*a*, 14*b* prevent the generation of the vacuum while the swing motor 2 is decelerating and braking, and work so as to refill the circuit at the hydraulic oil discharging side of the swing motor 2 with the hydraulic oil from the hydraulic oil tank 15 if the pressure of the circuit decreases. A pressure sensor 5 (hydraulic pressure detecting unit) is disposed on the swing oil-hydraulic circuit L1 between the hydraulic pump 1 and control valve 12. This pressure sensor 5 detects the hydraulic pressure $P_2$ of the swing oil-hydraulic circuit L1. The hydraulic pressure $P_2$ detected by the pressure sensor 5 is input to a controller 10 which will be described later.

[1-2. Negative Control Circuit L2]

A main relief valve 13 is disposed on the center bypass of the swing oil-hydraulic circuit L1. The main relief valve 13 is provided to take out the hydraulic pressure of the center bypass as a so-called negative control pressure. The negative control circuit L2 described above branches from the center bypass upstream of the main relief valve 13, and is connected to a shuttle valve 18.

The shuttle valve 18 is a selective valve which selects a higher pressure, and includes two input ports 18*a*, 18*b*. This shuttle valve 18 selectively outputs a higher hydraulic pressure of the hydraulic pressures from two systems. The output port of the shuttle valve 18 is connected to the regulator 1*a*.

One input port 18*a* of the shuttle valve 18 is connected to the negative control circuit L2 described above. Namely, a general negative control pressure is introduced into this input port 18*a*. The other input port 18*b* is connected to a solenoid proportional pressure-reducing valve 17.

The solenoid proportional pressure-reducing valve 17 is a proportional pressure-reducing valve controlled by the controller 10 which will be described later, and coercively changes the negative control pressure by introducing the hydraulic oil supplied from a pilot pump 16 to the other input port 18*a*. Note that this solenoid proportional pressure-reducing valve 17 raises the secondary pressure (hydraulic pressure at the downstream side) as the opening of the valving element increases.

[1-3. Operation Pilot Circuit L3]

The operation pilot circuit L3 is a pilot circuit connecting the both ends of the flow rate control spool of the control valve 12 and a remote control valve 19. In the remote control valve 19, a swing pilot pressure (so-called remote control pressure) corresponding to an operation amount input into the swing lever (not shown) is generated, and the swing pilot pressure is introduced into either end of the flow rate control spool depending on the operation direction.

The remote control valve 19 includes a shuttle valve 20 for detecting the swing pilot pressure and a swing operation pressure sensor 4 (swing operation amount detecting unit) therein. The shuttle valve 20 is a high pressure selective valve which selects higher one of the swing pilot pressures introduced into both ends of the flow rate control spool.

The swing operation pressure sensor 4 detects the swing pilot pressure $P_1$ (amount of the swing operation) selected by the shuttle valve 20. This allows the swing operation pressure sensor 4 to detect the swing pilot pressure $P_1$ corresponding to the amount of the operation of the swing lever regardless of its operation direction. The swing pilot pressure $P_1$ detected here is input to the controller 10.

[2. Control Configuration]

The controller 10 is an electronic control device including a microcomputer, and is provided as an LSI device into which well-known microprocessors, ROMs, RAMs and the like are integrated.

Figure 3:
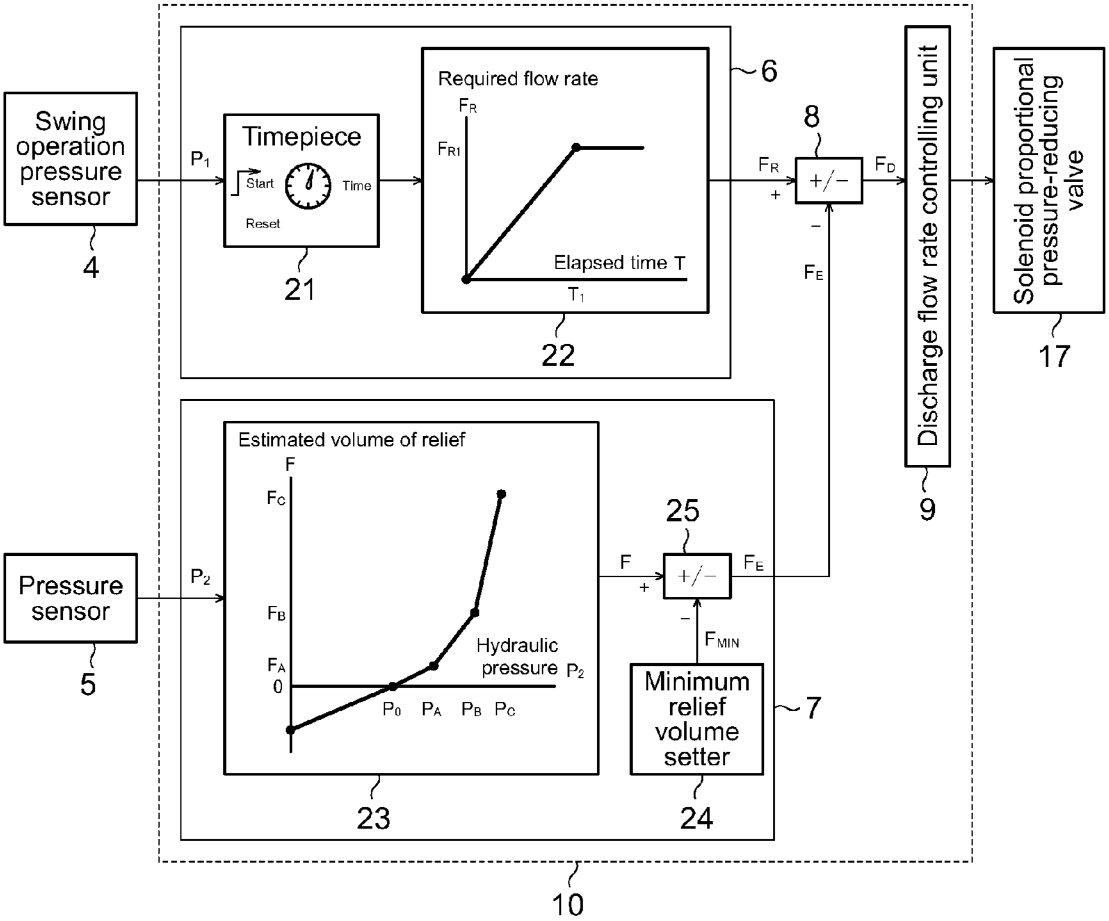
FIG. 3 is a control block diagram according to the hydraulic swing-controlling apparatus.

The controller 10 is connected to the swing operation pressure sensor 4 and pressure sensor 5 which is described above, and controls the opening of the solenoid proportional pressure-reducing valve 17 based on input information from the sensors 4, 5 as shown in FIG. 1. The controller 10 includes a required flow rate setting unit 6, a relief volume estimating unit 7, a pump flow rate subtracting unit 8, and a discharge flow rate controlling unit 9. Namely, in the controller 10, software for carrying out control schematically shown in FIG. 3 is programmed. The method of controlling of the opening the solenoid proportional pressure-reducing valve 17 will be described in detail with reference to FIG. 3 below.

The required flow rate setting unit 6 sets the required flow rate $F_R$ of the hydraulic oil required for the swing motor 2 based on the swing pilot pressure $P_1$ detected by the swing operation pressure sensor 4. The required flow rate setting unit 6 includes a timepiece 21 and a flow rate setter 22, which set the required flow rate $F_R$ as a function of the elapsed time T from the start of the swing operation. After detecting an increased swing pilot pressure $P_1$, the timepiece 21 starts timing by a timer, and outputs the elapsed time T. The flow rate setter 22 then sets the required flow rate $F_R$ depending on the elapsed time T based on the correlation map of the elapsed time T and the required flow rate $F_R$ shown in FIG. 3, and outputs the required flow rate to the pump flow rate subtracting unit 8.

In the correlation map of the flow rate setter 22, the increment $\Delta F_R$ of the required flow rate $F_R$ is set to the fixed predetermined value $a_1$ (i.e. $a_1=F_{R1}/T_1$) when the elapsed time T is $0 \le T \le T_1$. The increment $\Delta F_R$ of the required flow rate $F_R$ is zero when the elapsed time T is $T_1 < T$.

Note that the time $T_1$ is set to be equal to the time required for the swing rate to increase to the maximum when the front work equipment of the hydraulic excavator has the maximum reach posture.

The relief volume estimating unit 7 estimates the volume of relief $F_E$ of the hydraulic oil relieved from the swing relief valves 3*a* and 3*b* based on the hydraulic pressure $P_2$ of the swing oil-hydraulic circuit L1 detected by the pressure sensor 5. The relief volume estimating unit 7 includes an estimated relief volume setter 23, a minimum relief volume setter 24, and subtracter 25.

The estimated relief volume setter 23 stores a map defining the correspondence relation between the hydraulic pressure $P_2$ and the estimated volume of relief F shown in FIG. 3. This map is created based on the override characteristics of the swing relief valves 3a and 3b.

In this map, the estimated volume of relief F is set to F=0 when the hydraulic pressure $P_2$ is equal to a relief pressure $P_0$ of the swing relief valves 3a and 3b. The estimated volume of relief F takes a negative value when the hydraulic pressure $P_2$ is less than the relief pressure $P_0$ ($P_2<P_0$). At this time, it is set that the absolute value of the estimated volume of relief F increases as the hydraulic pressure $P_2$ decreases.

Alternatively, the estimated volume of the relief F takes a positive value when the hydraulic pressure $P_2$ exceeds the relief pressure $P_0$ ($P_2>P_0$). At this time, the estimated volume of relief F is a value reflecting the override characteristics of the swing relief valves 3a and 3b. For example, if the relief flow rates are respectively $F_A$, $F_B$, and $F_C$ at the primary pressures $P_A$, $P_A$, and $P_C$ from the override characteristics of the swing relief valves 3a and 3b shown in FIG. 2, the estimated volumes of relief F are also respectively set to $F_A$, $F_B$, and $F_C$ at the hydraulic pressures $P_A$, $P_B$, and $P_C$ in the map.

The minimum relief volume setter 24 sets the minimum volume of relief desired to be relieved from the swing relief valves 3a and 3b while the swing motor 2 is starting and accelerating. The ensured minimum volume of relief $F_{MIN}$ set here is always fixed regardless of the swing rate and the elapsed time T from the start of the swing operation.

The subtracter 25 calculates the volume of relief $F_E$ by subtracting the ensured minimum volume of relief $F_{MIN}$ set by the minimum relief volume setter 24 from the estimated volume of relief F set by the estimated relief volume setter 23. The volume of relief $F_E$ calculated here is input into the pump flow rate subtracting unit 8.

The pump flow rate subtracting unit 8 calculates an appropriate flow rate $F_D$ by subtracting the volume of relief $F_E$ estimated by the relief volume estimating unit 7 from the required flow rate $F_R$ set by the required flow rate setting unit 6. The appropriate flow rate $F_D$ can be expressed by the following formula. The appropriate flow rate $F_D$ calculated here is input into the discharge flow rate controlling unit 9. Note that the actual discharge flow rate discharged from the hydraulic pump 1 is controlled using this appropriate flow rate $F_D$ as a target value.

$$\begin{aligned} F_D &= F_R - F_E \\ &= F_R + F_{MIN} - F \end{aligned} \qquad \text{[Formula 1]}$$

The discharge flow rate controlling unit 9 controls the discharge flow rate of the hydraulic pump 1 based on an appropriate flow rate $F_D$ calculated by the pump flow rate subtracting unit 8. The discharge flow rate controlling unit 9 controls the solenoid proportional pressure-reducing valve 17 by opening and closing its valve so as to generate a negative control pressure required for discharging the appropriate flow rate $F_D$ from the hydraulic pump 1.

For example, since the hydraulic oil discharged from the oil-hydraulic motor 1 is introduced into the first supply path L4 or the second supply path L5 from the control valve 12 while the swing motor 2 is operating, the hydraulic pressure (negative control pressure) of the center bypass decreases, accordingly the regulator 1a is controlled so as to increase the discharge flow rate from the hydraulic pump 1 according to the decreased hydraulic pressure. On the other hand, the controller 10 coercively increases the negative control pressure by introducing the hydraulic oil with a higher pressure than the negative control pressure introduced to the shuttle valve 18 from the negative control circuit L2 to the shuttle valve 18, and corrects the discharge flow rate from the hydraulic pump 1 to decrease.

[3. Operation]

When the swing lever of the hydraulic excavator is operated, the swing pilot pressure $P_1$ is detected by the swing operation pressure sensor 4, and is input to the controller 10. The swing pilot pressure $P_1$ is transferred to the control valve 12 through the swing pilot circuit L3, and drives the flow rate control spool. This drives the swing motor 2, and the hydraulic excavator starts the swing operation. The hydraulic pressure $P_2$ over the swing oil-hydraulic circuit L1 is detected by the pressure sensor 5, and is input to the controller 10.

The required flow rate setting unit 6 of the controller 10 measures the elapsed time T after the increased swing pilot pressure $P_1$ is detected, and sets the required flow rate $F_R$ as a function of the elapsed time T.

[3-1. In the Case of Front Work Equipment Having a Standard Reach Posture]

Figure 4:
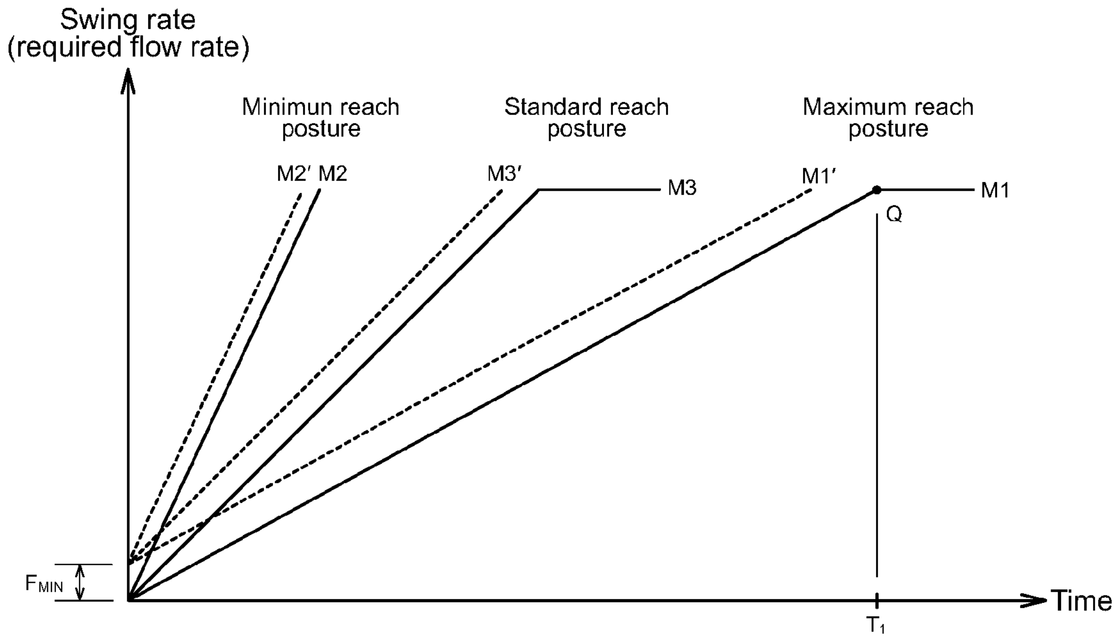
FIG. 4 is a graph illustrating the operation of this hydraulic swing-controlling apparatus.

In the case of front work equipment having a standard reach posture, the hydraulic excavator swings at a swing rate shown by the solid line M3 in FIG. 4. While the required flow rate setting unit 6 sets the required flow rate $F_R$ in the range below this solid line M3. The relief volume estimating unit 7 sets the estimated volume of relief F according to the hydraulic pressure $P_2$ of the swing oil-hydraulic circuit L1, and subtracts the ensured minimum volume of relief $F_{MIN}$ from the estimated volume of relief F to calculate the volume of relief $F_E$.

If the hydraulic pressure $P_2$ of the swing oil-hydraulic circuit L1 is higher than the relief pressure $P_0$ of the swing relief valves 3a and 3b, energy is lost corresponding to the relieved hydraulic oil. While the estimated relief volume setter 23 exactly estimates the volume of the hydraulic oil which may be relieved by setting the estimated volume of relief F based on the override characteristics of the swing relief valves 3a and 3b. The pump flow rate subtracting unit 8 subtracts the volume of the hydraulic oil which may be relieved from the required flow rate $F_R$ to calculate the flow rate which is not relieved. Since the appropriate flow rate $F_D$ includes the ensured minimum volume of relief $F_{MIN}$, the actual volume of the hydraulic oil discharged from the hydraulic pump 1 is a value obtained by adding the ensured minimum volume of relief $F_{MIN}$ to the flow rate required for the swing operation (solid line M3) as shown by a dashed line M3 in FIG. 4.

[3-2. In the Case of Front Work Equipment Having the Maximum Reach Posture]

In the case of front work equipment having the maximum reach posture, the hydraulic excavator swings at a swing rate shown by the solid line M1 in FIG. 4, due to the high moment of inertia of the machine body. Since the required flow rate $F_R$ set by the required flow rate setting unit 6 is too large compared to its swing rate, the hydraulic pressure $P_2$ of the swing oil-hydraulic circuit L1 exceeds that at the standard reach posture. Accordingly, the volume of relief $F_E$ estimated by the relief volume estimating unit 7 also increases, and the actual volume of the hydraulic oil discharged from the hydraulic pump 1 decreases.

The pump flow rate subtracting unit 8 calculates the relief flow rate $F_E$, which is obtained by adding the ensured minimum volume of relief $F_{MIN}$ to the flow rate estimated not to be relieved from the override characteristics of the swing relief valves 3a and 3b, as in the standard reach posture. Accordingly, the discharge flow rate of the hydraulic pump 1 is a value obtained by adding the ensured minimum volume of relief $F_{MIN}$ to the flow rate required for the swing operation (solid line M1) as shown by a dashed line M1' in FIG. 4.

[3-3. In the Case of Front Work Equipment Having the Minimum Reach Posture]

In the case of front work equipment having the minimum reach posture the hydraulic excavator swings at a swing rate shown by the solid line M2 in FIG. 4, due to the low moment of inertia of the machine body. Since the required flow rate $F_R$ set by the required flow rate setting unit 6 is too small compared to its swing rate, the hydraulic pressure $P_2$ of the swing oil-hydraulic circuit L1 decreases more than that at the standard reach posture. Accordingly, the volume of relief $F_E$ estimated by the relief volume estimating unit 7 decreases, and the actual volume of the hydraulic oil discharged from the hydraulic pump 1 increases.

The pump flow rate subtracting unit 8 calculates the relief flow rate $F_E$ as in the standard reach posture. Since the estimated volume of relief F set by the estimated relief volume setter 23 takes a negative value when the hydraulic pressure $P_2$ is less than the relief pressure $P_0$, the actual volume of the hydraulic oil including the ensured minimum volume of relief $F_{MIN}$ discharged from the hydraulic pump 1 is corrected to increase, in this case. Accordingly, the discharge flow rate from the hydraulic pump 1 is a value obtained by adding the ensured minimum volume of relief $F_{MIN}$ to the flow rate required for the swing operation (solid line M2) as shown by a dashed line M2' in FIG. 4.

[4. Advantageous Effect]

As described above, according to the hydraulic swing-controlling apparatus, the volume of relief during the swing operation can be held at a fixed ensured minimum volume of relief $F_{MIN}$, and the relief losses caused while the swing operation is starting and accelerating can be reduced, and the energy efficiency can be improved.

During the swing operation and relevant operation of the front work equipment, the hydraulic pressure $P_2$ of the swing oil-hydraulic circuit L1 decreases and the estimated volume of relief F decreases; hence, the ensured minimum volume of relief $F_{MIN}$ is held. Namely, the discharge flow rate of the hydraulic pump 1 can be corrected automatically for the fluctuation of the flow rate caused by the swing operation with other actuators working, and the most appropriate energy efficiency can be achieved.

In addition, according to the hydraulic swing-controlling apparatus, the volume of relief can be exactly estimated before the actual hydraulic oil is relieved using the override characteristics of swing relief valves 3*a* and 3*b*. Namely, there is no need to measure the actual relief flow rate, and the discharge flow rate of the hydraulic pump 1 can be controlled without waiting for relief by a control delay and a control error, and the response of control can be improved.

In the correction calculation of the discharge flow rate of the hydraulic pump 1 in the controller 10, the hydraulic swing-controlling apparatus can not only estimate the volume of relief from the swing relief valves 3*a* and 3*b*, but also increase the appropriate flow rate $F_E$ more than the required flow rate $F_R$ because the volume of relief is estimated as a negative value if the hydraulic pressure $P_2$ is less than the relief pressure $P_0$.

Accordingly, the discharge flow rate of the hydraulic pump 1 can be increased within a range where the volume of relief is kept to the minimum $F_E$ in the state of a posture with a low moment of inertia (posture with a high swing rate). Additionally, the discharge flow rate of the hydraulic pump 1 can be decreased so as to reduce the volume of relief to the minimum $F_E$ in the state of a posture with a high moment of inertia (posture with a low swing rate).

Accordingly, the most appropriate discharge flow rate of the hydraulic pump 1 can be ensured regardless of the machine body postures, and the energy efficiency can be improved. Since the required flow rate $F_R$ is set as a function of the elapsed time T from the start of the swing operation in the hydraulic swing-controlling apparatus, the swing rate can be easily controlled uniformly.

[5. Others]

While the embodiment of the present invention has been described, the present invention is not limited to the embodiment described above, and many variations can be made without departing the scope of the present invention. For example, in the embodiment described above, the hydraulic excavator, which includes the hydraulic swing lever driving the flow rate control spool of the control valve 12 by the swing pilot pressure $P_1$ generated by the remote control valve 19 is illustrated. Alternatively a hydraulic excavator including an electrical swing lever can be used. In this case, the timepiece 21 can start timing by the timer after the input signal from lever is detected.

A configuration in which the maximum value of the required flow rate $F_R$ is changed according to the amount of operation of the swing lever can be incorporated into the flow rate setter 22. For example, a possible measure is to set a value of the required flow rate $F_{R1}$ set by the flow rate setter 22 as function of the swing pilot pressure $P_1$. With such a setting, the swing rate can be flexibly adjusted while the most appropriate swing flow rate is kept regardless of the machine body postures.

The ensured minimum volume of relief $F_{MIN}$ set by the minimum relief volume setter 24 can be set to any value. Accordingly, the relief losses can be reduced to an ultimate value by reducing the ensured minimum volume of relief $F_{MIN}$ as much as possible.

INDUSTRIAL APPLICABILITY

The present invention is available to the overall manufacturing industry of work machines such as hydraulic excavators and hydraulic cranes equipped with swing motors.

REFERENCE SIGNS LIST

1 hydraulic pump
2 swing motor
3*a* and 3*b* swing relief valve
4 swing operation pressure sensor (swing operation amount detecting unit)
5 pressure sensor (hydraulic pressure detecting unit)
6 required flow rate setting unit
7 relief volume estimating unit
8 pump flow rate subtracting unit
9 discharge flow rate controlling unit
10 controller
11 engine
12 control valve
13 main relief valve
14*a* and 14*b* vacuum regulator valve
15 hydraulic oil tank
16 pilot pump
17 solenoid proportional pressure-reducing valve
18 shuttle valve
19 swing operation amount remote control valve (remote control valve)
20 shuttle valve

21 timepiece
22 flow rate setter
23 estimated relief volume setter
24 minimum relief volume setter
25 subtracter
L1 swing oil-hydraulic circuit
L2 negative control circuit
L3 operation pilot circuit
L4 first supply path
L5 second supply path

What is claimed is:

1. A hydraulic swing-controlling apparatus of a work machine including a processor, comprising:

a hydraulic pump installed in the work machine;

a swing motor which receives supply of hydraulic oil from the hydraulic pump and swings the work machine;

a swing relief valve provided on an oil-hydraulic circuit connecting the hydraulic pump and the swing motor and between the hydraulic pump and the swing motor, which defines the upper limit of a pressure of the hydraulic oil in the oil-hydraulic circuit connecting between the hydraulic pump and the swing motor during operation of the swing motor;

a hydraulic pressure detecting unit which detects a hydraulic pressure supplied from the hydraulic pump to the swing motor;

a swing operation amount detecting unit which detects the amount of the swing operation related to a swing motion of the swing motor;

a required flow rate setting unit, performed by the processor, which sets a required flow rate of the hydraulic oil required for the swing motor based on the amount of the swing operation detected by the swing operation amount detecting unit;

a relief volume estimating unit, performed by the processor, which estimates the volume of relief of the hydraulic oil relieved from the swing relief valve based on the hydraulic pressure detected by the hydraulic pressure detecting unit, the relief volume estimating unit estimating the volume of relief as a negative value when the hydraulic pressure detected by the hydraulic pressure detecting unit is lower than a relief pressure of the swing relief valve;

a minimum relief volume setting unit, performed by the processor, which sets a minimum volume of relief desired to be relieved from the swing relief valve;

a pump flow rate subtracting unit, performed by the processor, which calculates an appropriate flow rate by subtracting the volume of relief estimated by the relief volume estimating unit from the required flow rate set by the required flow rate setting unit and by adding the minimum volume of relief set by the minimum relief volume setting unit; and a discharge flow rate controlling unit, performed by the processor, which controls the discharge flow rate of the hydraulic pump based on the appropriate flow rate calculated by the pump flow rate subtracting unit;

wherein the relief volume estimating unit estimates the volume of relief based on the hydraulic pressure and the override characteristics of the swing relief valve.

2. The hydraulic swing-controlling apparatus of the work machine according to claim 1, wherein the relief volume estimating unit estimates the volume of relief as a positive value if the hydraulic pressure is higher than the relief pressure of the swing relief valve.

3. The hydraulic swing-controlling apparatus of the work machine according to claim 1, wherein the required flow rate setting unit sets the required flow rate as a function of elapsed time from the detection of the amount of the swing operation by the swing operation amount detecting unit, and sets the maximum value of the required flow rate which increases as the amount of the swing operation increases.

4. The hydraulic swing-controlling apparatus of the work machine according to claim 2, wherein the required flow rate setting unit sets the required flow rate as a function of elapsed time from the detection of the amount of the swing operation by the swing operation amount detecting unit, and sets the maximum value of the required flow rate which increases as the amount of the swing operation increases.

* * * * *